United States Patent
Kobayashi (10) Patent No.: US 8,115,394 B2
(45) Date of Patent: Feb. 14, 2012

(54) HEADLAMP CONTROLLER

(75) Inventor: Shoji Kobayashi, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 254 days.

(21) Appl. No.: 12/628,617

(22) Filed: Dec. 1, 2009

(65) Prior Publication Data

US 2010/0134011 A1 Jun. 3, 2010

(30) Foreign Application Priority Data

Dec. 3, 2008 (JP) .................................. 2008-308148

(51) Int. Cl.
*B60Q 1/02* (2006.01)
(52) U.S. Cl. ............. 315/82; 315/77; 315/294; 315/158; 362/460; 362/464; 362/466; 340/469; 340/933; 340/937; 382/104; 382/106
(58) Field of Classification Search ............... 315/77–82, 315/158, 294, 297; 362/460, 464–466, 507, 362/525, 527; 340/463–469, 933, 937; 382/103–106; 706/22–24
See application file for complete search history.

(56) References Cited

U.S. PATENT DOCUMENTS

| 6,254,259 | B1* | 7/2001 | Kobayashi | 362/465 |
| 6,587,573 | B1* | 7/2003 | Stam et al. | 382/104 |
| 6,960,005 | B2* | 11/2005 | Daicho et al. | 362/466 |
| 7,565,006 | B2* | 7/2009 | Stam et al. | 382/155 |
| 7,656,277 | B2* | 2/2010 | Kawasaki | 340/425.5 |
| 7,918,594 | B2* | 4/2011 | Watanabe et al. | 362/507 |
| 2010/0052550 | A1* | 3/2010 | Kobayashi | 315/158 |

FOREIGN PATENT DOCUMENTS

JP  2007-334859 A  12/2007

* cited by examiner

*Primary Examiner* — Haiss Philogene
(74) *Attorney, Agent, or Firm* — Sughrue Mion, PLLC (57) ABSTRACT

A headlamp controller includes: a headlamp unit configured to illuminate a front area of a vehicle with a light distribution pattern; an image capturing camera configured to capture an image of the front area; and a light distribution controller including: a road shape detecting unit configured to detect a road shape based on the captured image; a reference optical flow generating unit configured to generate a reference optical flow for a target object belonging to one of attributes based on the road shape; a bright point optical flow measuring unit configured to measure an optical flow of a bright point defined as a target in the captured image; and an attribute determining unit configured to compare the reference optical flow with the optical flow of the bright point and determine which one of the attributes the optical flow of the bright point belongs.

5 Claims, 7 Drawing Sheets

HEADLAMP CONTROLLER

CROSS REFERENCE TO RELATED APPLICATION(S)

The present disclosure relates to the subject matters contained in Japanese Patent Application No. 2008-308148 filed on Dec. 3, 2008, which are incorporated herein by reference in its entirety.

FIELD

The present invention relates to a headlamp controller which employs an Adaptive Front-lighting System (AFS) for turning an illumination direction of a headlamp of a vehicle, such as an automobile, in accordance with a variation in steering angle of the vehicle, and to a headlamp controller which is capable of appropriately controlling a light distribution of the headlamp so as to prevent glare toward other vehicles existing in front of the vehicle.

BACKGROUND

There is proposed a system called Adaptive Front-lighting System (AFS), which turns an illumination direction of a headlamp in the transverse direction in accordance with a variation in the steering angle of a steering wheel so as to improve safety in driving an automobile. According to this system, it is advantageous in that the illumination direction of the headlamp can be turned to a direction steered by a driver, that is, a direction in which an automobile travels in addition to the forward direction and the driving safety may be improved.

However, when the illumination direction of the headlamp is controlled based on only the steering angle, a problem may arise in that glare may influence an oncoming vehicle or a preceding vehicle existing in front of an own vehicle. For this reason, it is desirable that the system is configured to detect the oncoming vehicle or the preceding vehicle and the illumination direction of the headlamp is controlled to be aligned to a direction facing a shoulder or a down direction when detecting the oncoming vehicle or the preceding vehicle.

As a technique to detect the oncoming vehicle or the preceding vehicle, there is known a technique that captures an image of a forward area of an own vehicle by using an image capturing camera and analyzes the captured image. In the technique of analyzing the captured image, at day time, the oncoming vehicle or the preceding vehicle can be recognized through an outline obtained by performing, for example, a SOBEL calculation or the like on an image. However, in night time, it is difficult to use this technique.

For this reason, a technique may be conceivable in which the oncoming vehicle or the preceding vehicle is recognized through a bright point in the captured image, the bright point corresponding to the light of the tail lamp of the preceding vehicle or the light of the headlamp of the oncoming vehicle. For example, a color of an origin of the captured image is detected in such a manner that white or color substantially the same as that is recognized as the light of the headlamp of the oncoming vehicle and red is recognized as the light of the tail lamp of the preceding vehicle.

However, since street lamps emitting light by itself or delineators indicating a shoulder by reflecting the light of the headlamp of the own vehicle exist in the road, these lights should be distinguished. As a technique for distinguishing these lights, there is proposed a technique of using an optical flow. For example, JP-A-2007-334859 discloses a technique capable of detecting a stationary object or a moving object by using an optical flow. Accordingly, it is possible to detect the oncoming vehicle or the preceding vehicle by detecting only the moving object excluding the stationary object.

In a case where the street lamps or the delineators are detected by using the optical flow as described in the document, JP-A-2007-334859, it is important to recognize a vanishing point obtained when the bright point for obtaining the optical flow moves from one point toward a specific point in the image and vanishes at the specific point.

Figure 8:
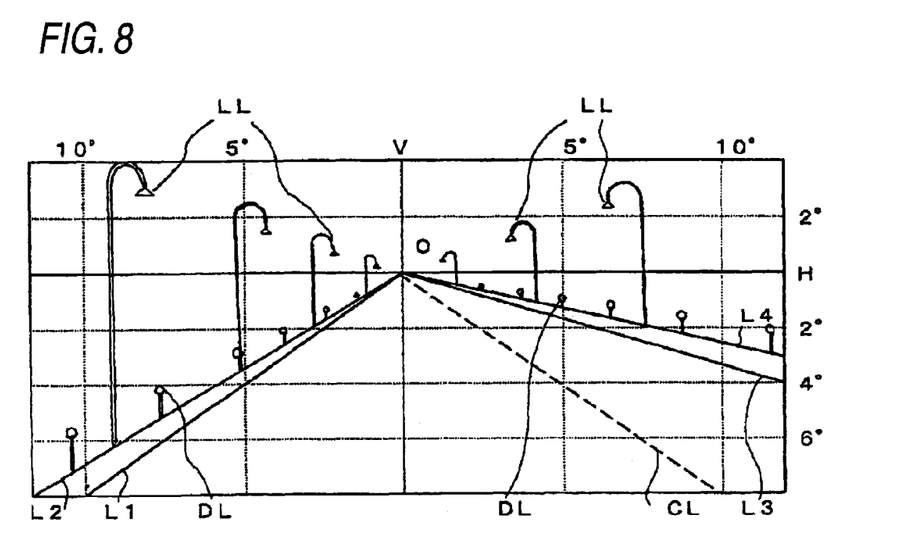
FIG. 8 is a diagram showing an example of a captured image of a straight road for obtaining an optical flow.

For example, FIG. 8 is a schematic diagram showing a captured image of a front area of the own vehicle traveling in a straight two-lane road, where an own lane line L1 and an own-lane-side shoulder line L2 form an own lane on the left side of a center line CL, an opposite lane line L3 and an opposite-lane-side shoulder line L4 form an opposite lane, street lamps LL are arranged at the high positions along the two shoulder lines L2 and L4, and delineators DL are arranged at the low positions. The street lamps LL arranged at the higher positions than the image capturing camera of the own vehicle are photographed at the higher position than the horizontal line H, and the delineators arranged at the lower positions than the image capturing camera of the own vehicle are photographed at the lower position than the horizontal line H.

In a case where the own vehicle travels in the straight road, since the vanishing point of each optical flow shown by the movement locus of the origin of each of the street lamps LL or the delineators DL faces the forward direction, that is, the center position between the horizontal line and the vertical line in the captured image, it is possible to determine the optical flow of each of the street lamps or the delineators. However, as described below, in the case of the curved road in which the road is curved toward the right or left or the case of the uphill road or downhill road, the vanishing point does not face the center position in the image. In this case, it is difficult to determine the attribute of the optical flow, that is, the street lamps or the delineators by using only the vanishing point.

Likewise, in a case where the vanishing point faces the forward direction, it is possible to highly precisely determine that the optical flow has the attribute of the street lamps or the delineators. However, in the case where the vanishing point faces a direction other than the forward direction, it is difficult to determine the attribute of the optical flow. In this case, the road information is obtained so as to know whether the road is the curved road, the uphill road, or the downhill road, and the attribute of the bright point is determined in consideration of the obtained road information.

It may be supposed that road information of a navigation unit is used as the road information. However, the accuracy of the road information of the navigation unit is low, and particularly in the curved road, the curvature radius of the curved road is not highly precisely obtained from the road information of the navigation unit. As a result, since it is difficult to determine whether the optical flow is disposed along the road, it is difficult to determine the attribute of the optical flow in high reliability. For this reason, it is difficult to reliably detect the oncoming vehicle or the preceding vehicle traveling in the curved road, the sloping road, or the like, and difficult to appropriately control the headlamp.

SUMMARY

One of objects of the present invention is to provide a headlamp controller capable of performing an appropriate headlamp control for preventing glare toward an oncoming vehicle, a preceding vehicle, or the like by determining an attribute of an optical flow in a captured image in high reliability.

According to an aspect of the invention, there is provided a headlamp controller including: a headlamp unit configured to illuminate a front area of a vehicle with a light distribution pattern that is controllable; an image capturing camera configured to capture an image of the front area of the vehicle and output a captured image; and a light distribution controller configured to control the headlamp unit to change the light distribution pattern by performing a calculation based on the captured image output from the image capturing camera, the light distribution controller including: a road shape detecting unit configured to detect a road shape based on the captured image; a reference optical flow generating unit configured to generate a reference optical flow for a target object belonging to one of attributes based on the road shape detected by the road shape detecting unit; a bright point optical flow measuring unit configured to measure an optical flow of a bright point defined as a target in the captured image; and an attribute determining unit configured to compare the reference optical flow with the optical flow of the bright point and determine which one of the attributes the optical flow of the bright point belongs.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENT(S)

Figure 1:
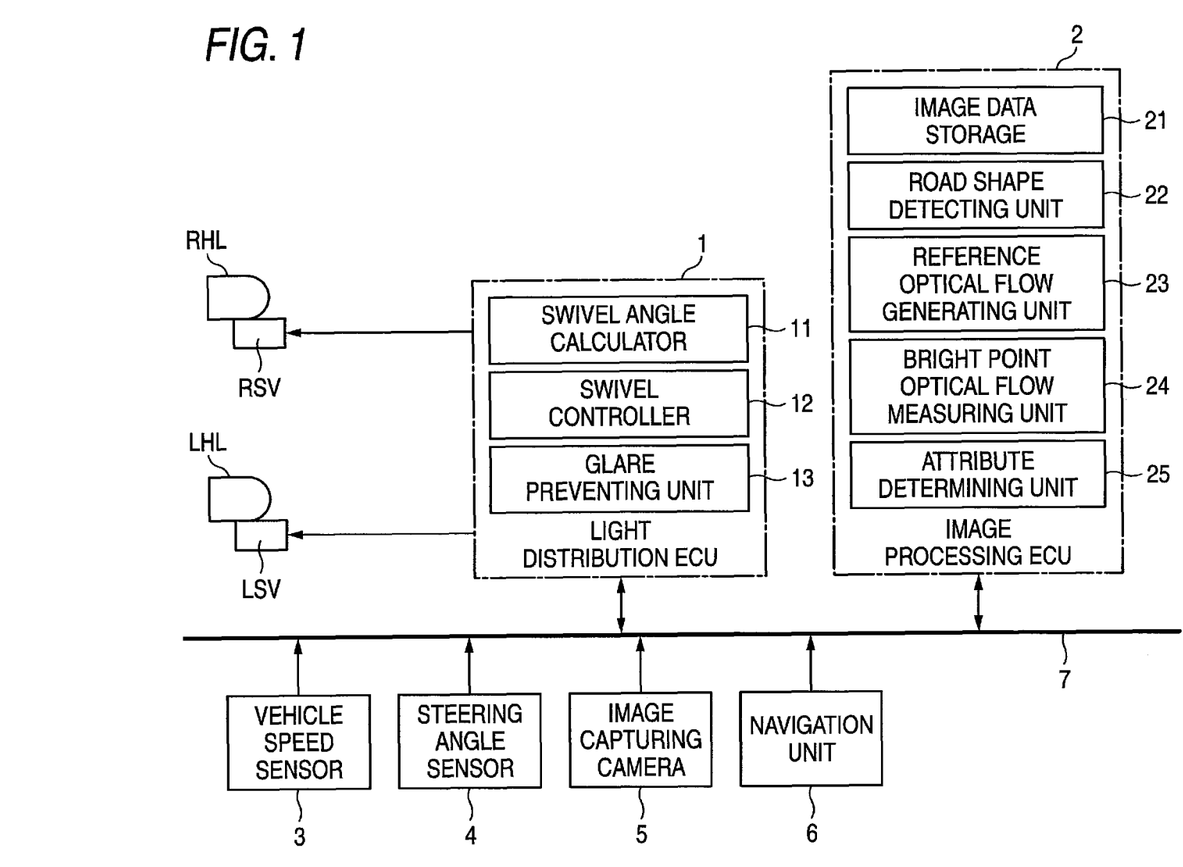
FIG. 1 is a schematic diagram showing a configuration of a system according to a embodiment.

An example of a headlamp controller according to an embodiment of the present invention will be hereinafter described with reference to the drawings. FIG. 1 is a schematic diagram showing a configuration according to the embodiment of the present invention.

Left and right headlamps LHL and RHL are capable to turn in a transverse direction by swivel units LSV and RSV. The swivel units LSV and RSV are controlled by a light distribution ECU (light distribution controller) 1. The light distribution ECU 1 is connected to an in-vehicle LAN 7.

The in-vehicle LAN 7 is connected to a vehicle speed sensor 3 that detects a vehicle speed of an own vehicle and a steering angle sensor 4 that detects a steering angle of the own vehicle. In addition, an image capturing camera 5 that captures an image of a forward area of the own vehicle is disposed in a front part of the own vehicle, for example, a part of an upper portion of a front glass, and is connected to the in-vehicle LAN 7.

Further, an image processing ECU 2 is connected to the in-vehicle LAN 7. The in-vehicle LAN 7 detects a moving object such as a preceding vehicle or an oncoming vehicle traveling in a road, a stationary object such as delineators or street lamps disposed on both sides of the road in which the own vehicle travels by processing an image data obtained by the image capturing camera 5. In addition, in the embodiment, a navigation unit 6 installed in the own vehicle is connected to the in-vehicle LAN 7.

The light distribution ECU 1 is provided with a swivel angle calculator 11 and a swivel controller 12. The swivel angle calculator 11 calculates a swivel angle suitable for the own vehicle based on the vehicle speed detected by the vehicle speed sensor 3 and the steering angle detected by the steering angle sensor 4. The swivel controller 12 controls the swivel units LSV and RSV so that the left and right headlamps LHL and RHL have the calculated swivel angles based on the calculated swivel angles. The light distribution ECU 1 controls the optical axes of two headlamps LHL and RHL based on the detected steering angle or the detected vehicle speed.

The light distribution ECU 1 is also provided with a glare preventing unit 13 that controls the swivel units LSV and RSV so as not to give glare toward the oncoming vehicle or the preceding vehicle by controlling the swivel units LSV and RSV so as to change the illumination directions of the left and right headlamps LHL and RHL or the brightness (light intensity) of the left and right headlamps is controlled when the image processing ECU 2 detects the oncoming vehicle or the preceding vehicle as described below.

The image processing ECU 2 is further provided with an image data storage 21, a road shape detecting unit 22, a reference optical flow generating unit 23, a bright point optical flow measuring unit 24, and an attribute determining unit 25.

The image data storage 21 stores an image data obtained from the image, which is included in the forward area of the own vehicle and is obtained by the image capturing camera 5.

The road shape detecting unit 22 detects a road shape by detecting a shoulder of the road or a lane mark painted on the road in the captured image, in order to detect the moving object or the stationary object existing in the forward area of the own vehicle based on the image data stored in the image data storage 21, that is, the captured image formed by the image data.

The reference optical flow generating unit 23 generates a reference optical flow with respect to the attribute of the stationary object based on the detected road shape.

The bright point optical flow measuring unit 24 measures an optical flow with respect to the bright point as a detection target of the captured image.

The attribute determining unit 25 compares the generated reference optical flow with the bright point optical flow and determines an attribute of the bright point optical flow as a target based on the comparison. The attribute determining unit 25 is capable of determining the stationary object based on the attribute of the bright point optical flow and particularly determining whether the stationary object is a street lamp or a delineator. The attribute determining unit 25 also determines whether the moving object is the oncoming vehicle or the preceding vehicle based on the bright point optical flow or the bright point which is not the stationary object.

Figure 2:
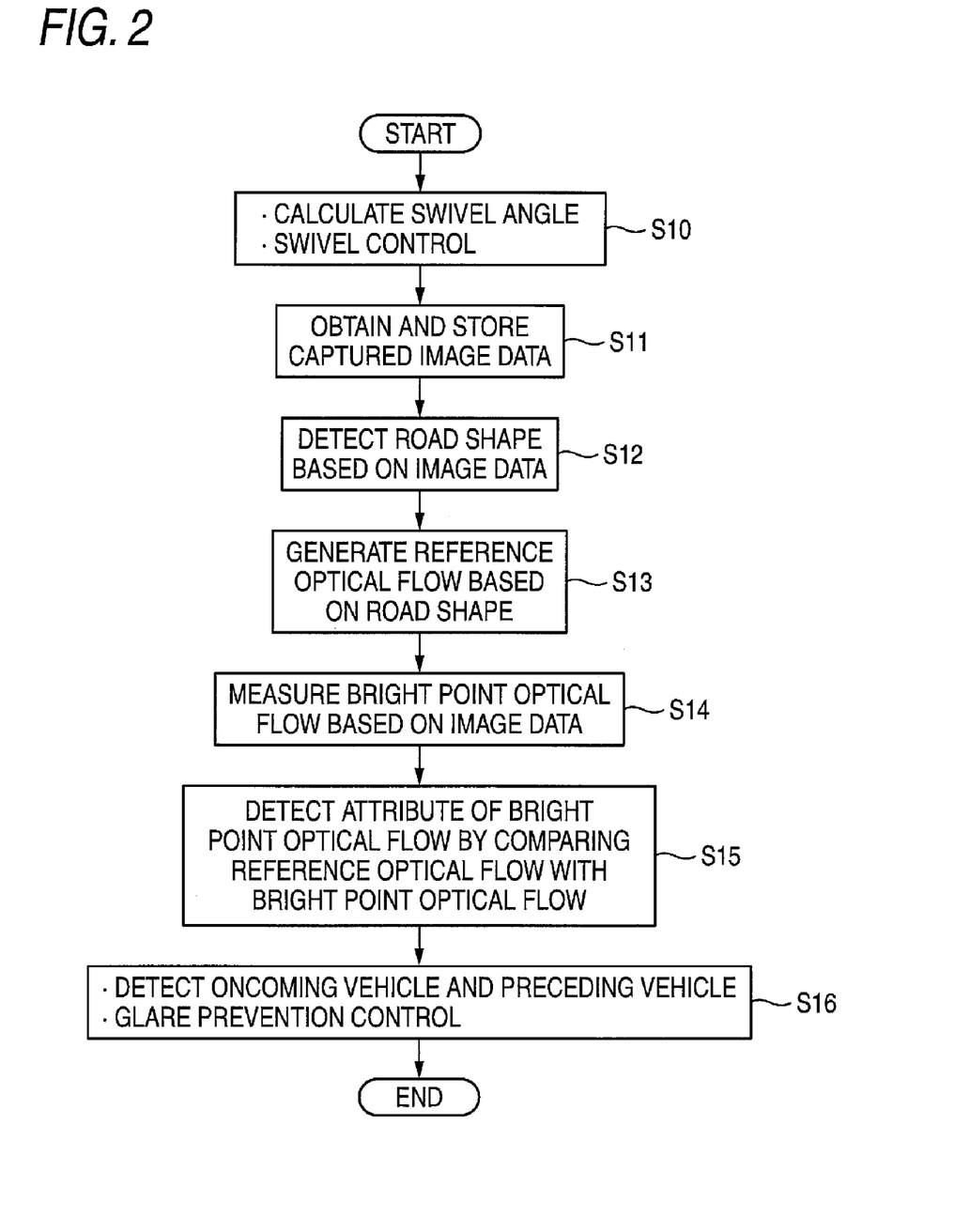
FIG. 2 is a flowchart illustrating an operation of the system according to the embodiment.

Now, an overall operation of the headlamp controller according to the embodiment will be described with reference to the flowchart shown in FIG. 2.

When the own vehicle travels, the swivel angle calculator 11 of the light distribution ECU 1 calculates the suitable swivel angel based on the steering angle obtained by the steering angle sensor 4 or the vehicle speed obtained by the vehicle speed sensor 3 of the own vehicle, and the swivel controller 12 controls the swiveling operation of the swivel units LSV and RSV of the left and right headlamps LHL and RHL based on the calculated swivel angles (S10). At the same time, the image processing ECU 2 obtains the image data of the image in the forward area of the own vehicle by using the image capturing camera 5, and stores the obtained image data in the image data storage (S11).

The road shape detecting unit 22 detects the shoulder of the road or the lane mark based on the captured and stored image data, that is, the captured image, and detects a road shape (a straight road, an uphill road, a downhill road, a curved road, or the like) in the forward area of the own vehicle based on the information on the shoulder of the road or the lane mark (S12).

Next, the reference optical flow generating unit 23 generates the optical flow such as the street lamp or the delineator as the reference optical flow based on the detected road shape (S13). Since the reference optical flow is generated for each of the street lamp and the delineator, plural reference optical flows may be obtained. The bright point optical flow measuring unit 24 detects the bright point from the captured image, and measures the optical flow of the bright point (S14).

The attribute determining unit 25 compares the generated reference optical flow with at least one measured bright point optical flow, and determines that the bright point optical flow has an attribute corresponding to the reference optical flow when detecting the bright point optical flow which is the same as the reference optical flow or the same as the bright point optical flow within a predetermined allowable error range among the measured one or more bright point optical flows (S15). That is, the attribute of the stationary object is unambiguously determined based on the road shape. The other bright point optical flows not having the attribute of the stationary object are determined as the moving objects. The oncoming vehicle and the preceding vehicle are determined from the bright point optical flow or the bright point determined as the moving object. The glare preventing unit 13 of the light distribution ECU 1 performs a glare preventing control in which the swivel angle is corrected or the light intensity is decreased so as to prevent glare toward the determined oncoming vehicle or preceding vehicle (S16).

The road shape detecting unit 22 extracts an outline of an image by performing, for example, a SOBEL calculation or the like on the image data of the captured image, and detects an information (herein, referred to as road shape information) closely related to the road shape such as the lane mark painted on the road or the shoulder of the road based on the outline. Then, based on the road shape information, it is detected whether the road in front of the own vehicle is a straight road or a curved road.

FIGS. 3A, 3B, 4A and 4B are diagrams in which the image data is schematically shown so as to correspond to the image capturing surface of the image capturing camera, where a center line in a two-lane road is denoted by CL, an own lane line is denoted by L1, a shoulder line is denoted by L2, an opposite lane line is denoted by L3, and a shoulder line is denoted by L4.

Figure 3A:
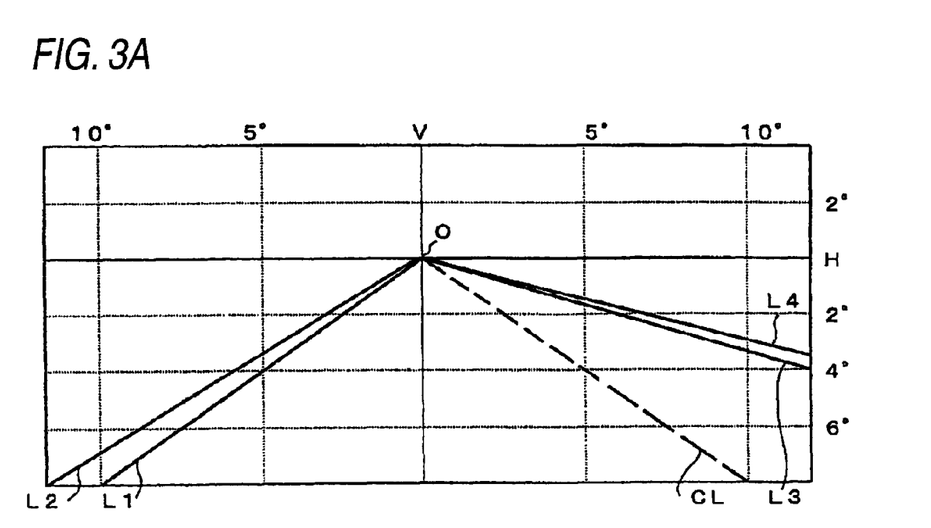
FIGS. 3A and 3B are diagrams illustrating a method of detecting a road shape (a straight road and a curved road).
Figure 3B:
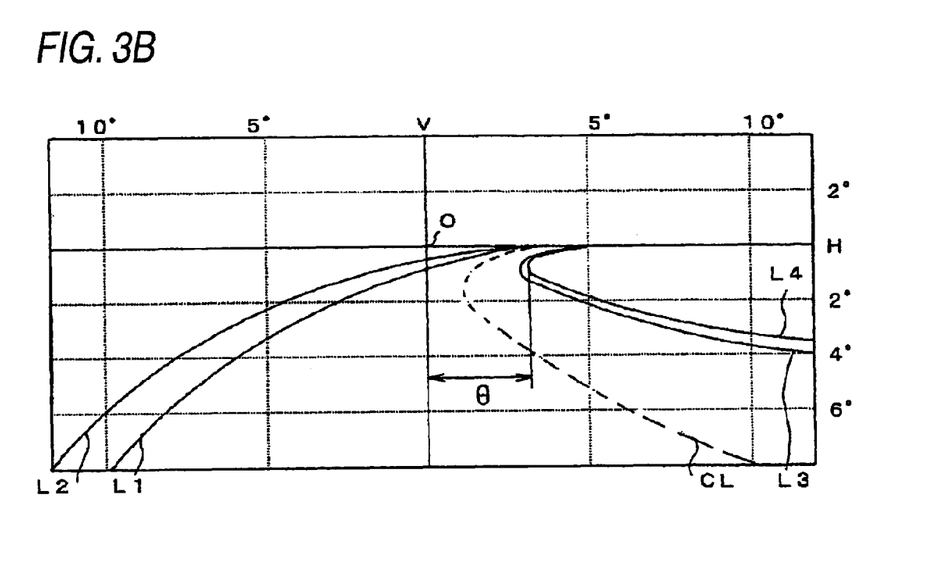

As shown in FIG. 3A, when the road shape information converges or vanishes toward an intersection point O (hereinafter, referred to as a center point) between a horizontal line H and a vertical line V, the straight road is detected. As shown in FIG. 3B, when the road shape information vanishes while converging toward the right side or the left side of the image (herein, the right side), the right curved road or the left curved road (herein, the right curved road) is detected.

Figure 4A:
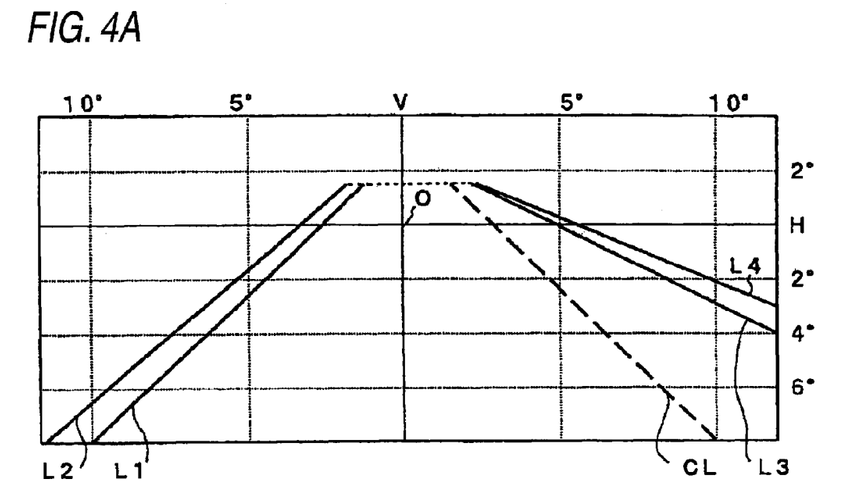
FIGS. 4A and 4B are diagrams illustrating a method of detecting a road shape (an uphill road and a downhill road).
Figure 4B:
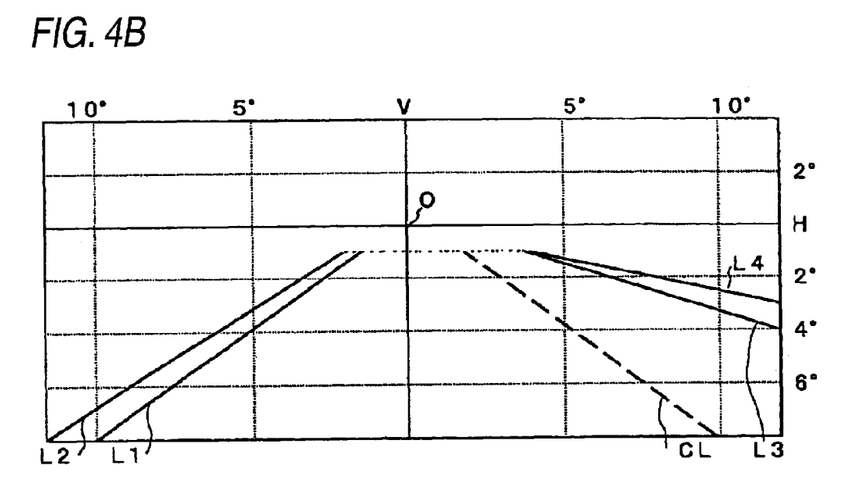

As shown in FIG. 4A, when the road shape information does not completely converge in the upside or the upper region of the horizontal line of the image and vanishes halfway even though the road shape information converges toward the upside of the image, the uphill road to be traveled is detected. As shown in FIG. 4B, when the road shape information does not completely converge in the vicinity of the horizontal line or the lower region of the horizontal line and vanishes even though the road shape information converges toward the upside of the image, the downhill road is detected. In the system according to the embodiment, an uphill curved road or a downhill curved road can be detected, but the description thereof will be omitted.

Regarding the detection of the curved road, at the time point when the own vehicle has entered into the curved road, it is possible to detect the curved road based on the steering angle at that time. However, at the time point when the own vehicle enters into the curved road or immediately after the own vehicle enters into the curved road, since the steering angle faces the forward direction, it is not possible to obtain a curvature radius from the steering angle. In this case, it is possible to obtain the curvature radius of the curved road based on the information of the navigation unit, but the accuracy is not satisfactory. Herein, the curvature radius is obtained based on the captured image.

Figure 5A:
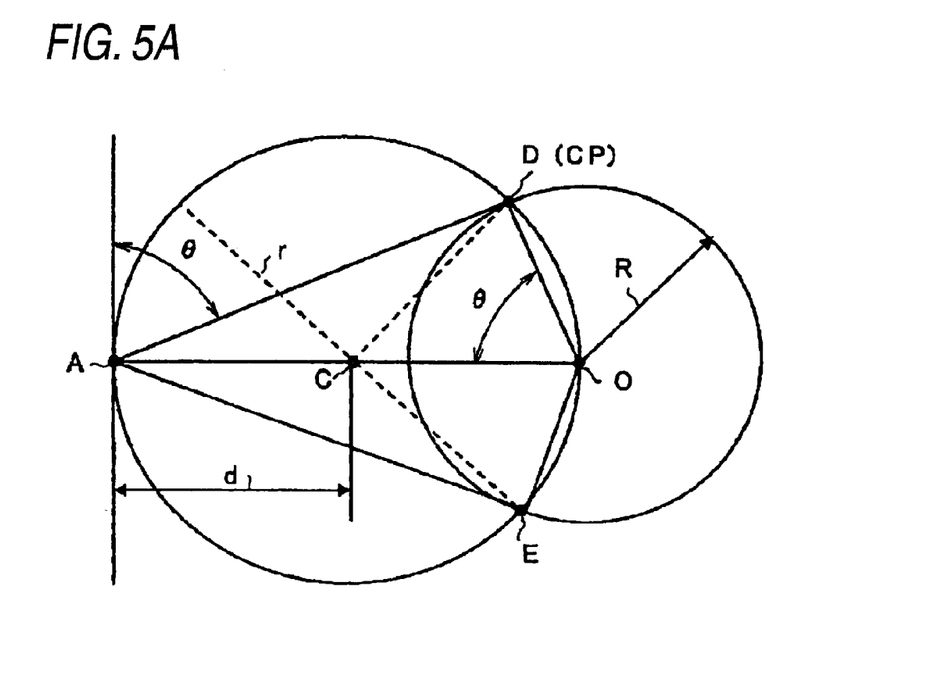
FIGS. 5A and 5B are diagrams illustrating a calculation method of detecting a curvature radius of a curved road.

Among the obtained road shape information, the top point in which the detected shoulder or lane mark is formed in a convex shape toward the left or right is set to a CP (clipping point). In the example shown in FIG. 3B, the CP corresponds to the opposite-lane-side shoulder line L4. At the time point immediately before the own vehicle enters into the curved road, as shown in FIG. 5A, the own vehicle exists at the point A, the curved road having a curvature radius R exists on the right side thereof, and then a distance between the center (camera position) of the own vehicle and the curved road is denoted by d. The CP is a contact point D between the point A and the radius R. The contact point between the edge of the radius R and the point A draws the edge of the radius r about the bisectional point C of the line AO. The contact points D and E between the edge of the radius R and the edge of the radius r corresponds to the contact point between the point A and the edge of the radius R.

Here, for example, in the case of FIG. 3B, the deviation angle θ of the CP is equal to the angle θ shown in the drawing. From a relationship of θ=a cos [R/(d+R)] is obtained, R=d·cos θ/(1−cos θ) is obtained.

Figure 5B:
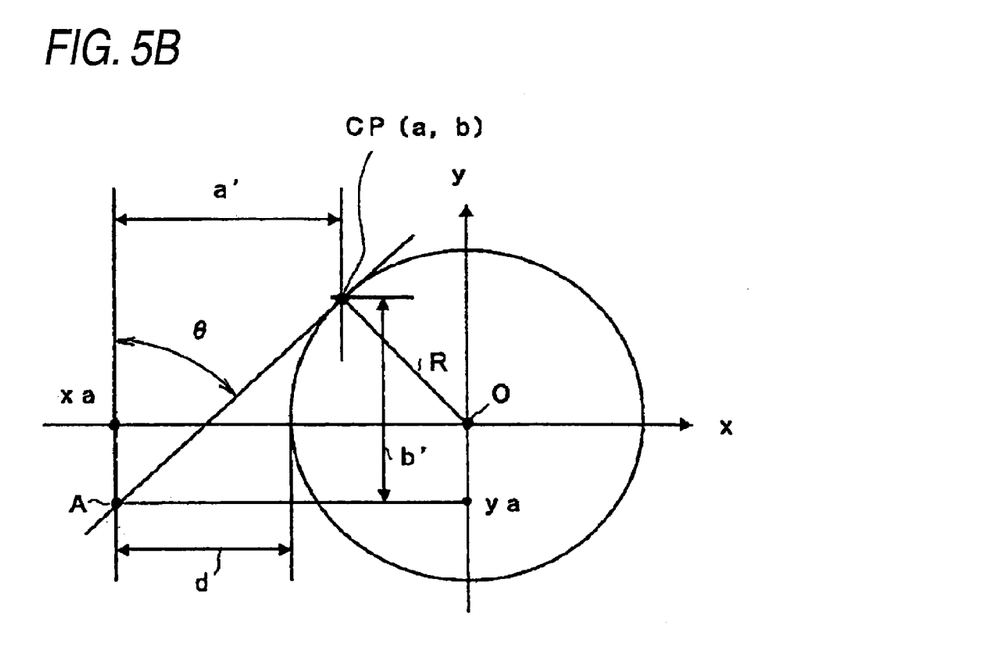

Meanwhile, when the own vehicle exists at a predetermined distance position immediately before the entrance into the curved road, as shown in the top view of the own vehicle and the curved road before the own vehicle in FIG. 5B, it is possible to calculate the displacement angle θ located in front of the own vehicle and connecting the point CP of the road and the own vehicle, and to calculate the curvature radius R of the curved road including the point CP based on the displacement angle θ. That is, when the own vehicle exists at the point A, the curved road having the radius R exists at the position having the distance y in the right forward direction, and the distance between the center of the own vehicle (the position of the image capturing camera) and the curved road is denoted by d, the displacement angle θ is obtained by drawing a contact line from the position A (xa, ya) of the own vehicle to the point CP (a, b). Assuming that there is a coordinate in which the distance to the right shoulder is set to d, the curvature radius of the curved road is set to R, and the rotation center O of the curved road is set to the origin, the following equation (1) is obtained from the tangential equation.

$$ax+by=R^2 \quad (1)$$

The X-direction distance a' and the y-direction distance b' between the point A and the point CP are detected from the image.

Then, the relationships shown by the following equations (2), (3) and (4) are established.

$$xa=a-a' \quad (2)$$

$$ya=b-b' \quad (3)$$

$$xa=-(d+R) \quad (4)$$

By applying the equation (4) to the equation (2), and being reformatted with respect to the unknown variable a, the following equation (5) is obtained.

$$a=a'-d-R \quad (5)$$

When the unknown a and b obtained from the equation (3) are applied to the equation (1), the following equation is obtained.

$$[(d-a')+R]\cdot(d+R)+(ya+b')\cdot ya=R^2$$

The above equation can be reformatted into the following equation.

$$(d-a')\cdot d+d\cdot R+(d-a')\cdot R+R^2+(ya+b')\cdot ya=R^2$$

The above equation can be further reformatted into the following equation.

$$(d-a')\cdot d+(ya+b')\cdot ya+R[d+(d-a')]=0$$

Accordingly, the following equation (6) is obtained.

$$R=[(d-a')\cdot d+(ya+b')\cdot ya]/(a'-2d) \quad (6)$$

Here, since it is possible to geometrically calculate the y-direction distance ya between the point A and the start point of the curved road and the x-direction distance d between the own vehicle and the shoulder, and to geometrically calculate the x-direction distance a' and the y-direction distance b' between the point A and the point CP, it is possible to obtain R by applying the resultant to the equation (6).

The reference optical flow generating unit 23 generates the reference optical flow for the attribute of the stationary object based on the road shape detected by the road shape detecting unit 22. For example, in the case where the reference optical flow of the street lamp is generated in the straight road shown in FIG. 3A, a street lamp reference optical flow LBOF is generated so as to extend in a substantially linear shape along the position (the height where the general street lamp is provided) higher than the road surface (ground) at the positions along the shoulder lines L2 and L4 of the own lane and the opposite lane of the straight road shape detected as depicted by the two-dot chain line in FIG. 6.

In the case of the delineator, in the same manner, a delineator reference optical flow DBOF (depicted by the three-dot chain line in FIG. 6) is generated so as to extend in a substantially linear shape along the position (the height where the general delineator is provided) higher than the road surface at the positions along both sides of the detected road shape. In the case where the detected road is the curved road shown in FIG. 3B, it is needless to say that the reference optical flow LBOF or DBOF is generated in a curve shape along the road shape or a linear shape including a curve. The optical flows of other stationary bodies can be obtained in the same manner as described above, but the description thereof will be omitted herein. Accordingly, based on the detected road shape, one or plural reference optical flows are generated so as to correspond to the street lamps or the delineators arranged in the general road.

Figure 7:
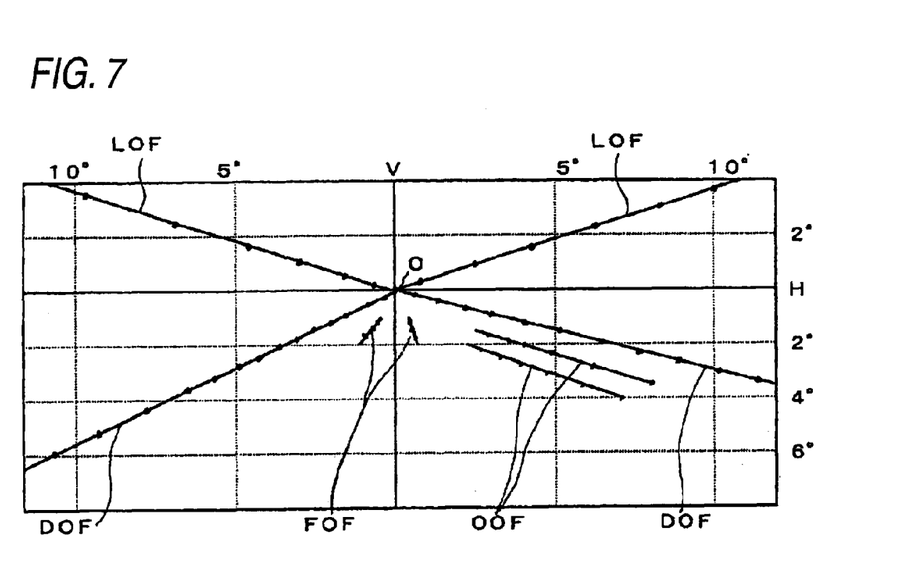
FIG. 7 is a diagram showing an example of a bright point optical flow.

The bright point optical flow measuring unit 24 measures the optical flow of the bright point actually existing in the captured image. For example, FIG. 7 shows an example in which an unknown bright point optical flow LOF corresponding to the optical flow of the street lamp and an unknown bright point optical flow DOF corresponding to the optical flow of the delineator are measured.

Since the technique for the bright point optical flow has been already proposed as shown in a related-art document JP-A-2007-334859, the description thereof will be omitted herein. However, in the case of the bright point of the street lamp or the delineator, plural bright points arranged at a predetermined interval therebetween in the captured image are measured as the bright point optical flow in which the position changes at a speed corresponding to the vehicle speed of the own vehicle along the arrangement direction.

Meanwhile, in the case of the bright point of the oncoming vehicle or the preceding vehicle, one pair or plural pairs of bright points in the captured image are measured as the bright point optical flow in which the position independently changes at a speed having a small relationship with the vehicle speed of the own vehicle. In FIG. 7, a bright point optical flow FOF of the preceding vehicle and a bright point optical flow OOF of the oncoming vehicle are shown.

Figure 6:
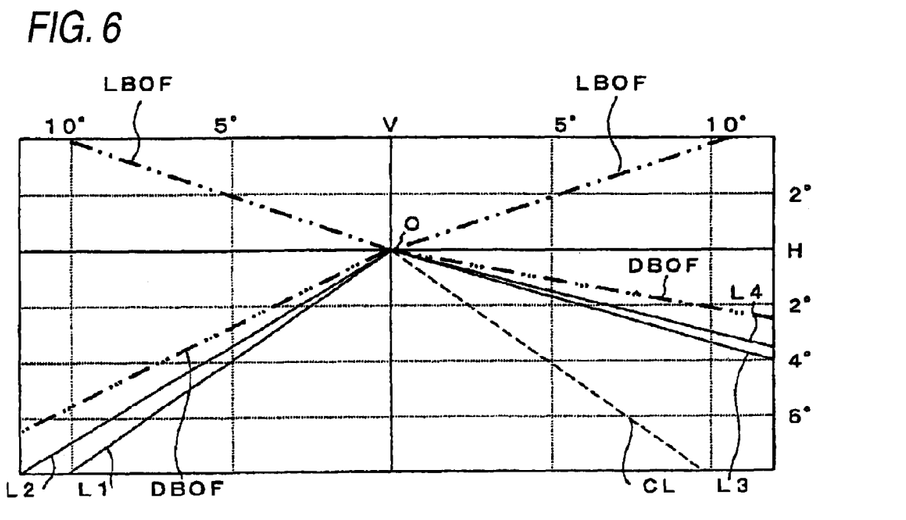
FIG. 6 is a diagram showing an example of a reference optical flow.

The attribute determining unit 25 compares one or plural bright point optical flows LOF, DOF, FOF, and OOF measured by the bright point optical flow measuring unit 24 with the reference optical flows LBOF and DBOF generated by the reference optical flow generating unit 23, and determines the attribute of the bright point optical flow as the target based on the comparison. In the attribute determining operation, the stationary object and the moving object are determined from the attribute of the bright point optical flow. It is determined whether the bright point is the street lamp or the delineator as the stationary object.

The bright point not determined as the stationary object is determined as the moving object, and it is determined whether the moving object is the oncoming vehicle or the preceding vehicle based on the determination. In the examples shown in FIGS. 6 and 7, since the bright point optical flows LOF and DOF are substantially the same as the reference optical flows LBOF and DBOF, it is determined that the former is the optical flow of the street lamp and the latter is the optical flow of the delineator. Since there is not the reference optical flow which is the same as the bright point optical flows FOF and OOF, the moving object is determined.

Here, the error range used in the attribute determining operation of the attribute determining unit 25 will be described with reference to the following examples (1) to (3).

(1) The curved road calculated by the road shape detecting unit 22 is based on the ideal circular shape. However, in fact, there are many curved roads such as an elliptical-arc-shaped curved road, a parabola-shaped curved road, and a complex curved road formed by the combination between a straight line and a curve compared with the ideal curved road. For this reason, an error inevitably occurs between the detected road shape and the reference optical flow generated based on the ideal circular shape. This error corresponds to the error in the attribute determining operation.

(2) Since the installation position or height of the image capturing camera is different in accordance with the type or the like of the automobile, a difference occurs in the road shape calculated based on the image captured by the image capturing camera 5. In addition, at the same time, a difference occurs in the position of the street lamp or the delineator captured in the image. Further, since the height position of the tail lamp or the headlamp of the preceding vehicle or the oncoming vehicle is different in accordance with the type of the vehicle, a difference occurs in the position of the captured image. This difference corresponds to the error in the attribute determining operation.

(3) Since the lane mark or the shoulder illuminated by the low beam of the vehicle and photographed and recognized by the image capturing camera 5 is located in the region of about 50 m in front of the own vehicle, it is difficult to detect the road shape in the forward area farther than 50 m. In this case, since the road shape is detected by using the road information obtained by the navigation device 6, the error included in the road information of the navigation unit 6 corresponds to the error in the attribute determining operation.

As described above, since the error is set in advance, even when there is an error in the comparison between the reference optical flow and the bright point optical flow, it is determined that the two optical flows are the same as each other if the error is within the error range set in the examples (1) to (3). Then, even when it is determined that the bright point optical flow as the determination target has the attribute of the reference optical flow as the comparison target, the possibility that the determination is correct is very high.

Now, an operation of determining the moving object performed by the attribute determining unit 25 will be described. When the target bright point optical flow is determined as the stationary object as a result of the comparison between the reference optical flow and the bright point optical flow, the other bright points or bright point optical flows are determined as the moving object. The bright point color of the bright point determined as the moving object is detected. The bright point color can be easily detected by performing a spectral analysis on the bright point. In the case where the bright point color is detected as red, the preceding vehicle is determined. In the case where the bright point color is detected as white or predetermined headlamp light, the oncoming vehicle is determined. In addition, at the same time, the moving direction and the speed of the moving object are calculated from the moving speed of the bright point in the captured image and the vehicle speed of the own vehicle. In the case where the moving object becomes closer to the own vehicle, the oncoming vehicle or the preceding vehicle traveling at the lower speed than the own vehicle is determined. Further, even in the case where the stationary object is determined, when the bright point does not have periodicity, the other stopped vehicle or the mark lamp fixed to the road is determined.

By determining the attribute of the bright point of the captured image as described above, it is possible to highly precisely detect the oncoming vehicle or the preceding vehicle existing in front of the own vehicle. Particularly, even in the case where the vanishing point of the bright point optical flow of the captured image faces a direction different from the forward direction or vanishes halfway, since the road shape is detected from the captured image and the highly probable reference optical flow for the detected road shape is generated, it is possible to highly precisely determine the attribute by corresponding the vanishing bright point optical flow to the reference optical flow. As a result, it is possible to highly precisely detect the oncoming vehicle or the preceding vehicle.

In addition, as described above, based on the determined oncoming vehicle or preceding vehicle, the light distribution ECU 1 performs the light distribution control in which the swivel angle is turned in a direction facing the shoulder or the light intensity of the headlamp is decreased so as to prevent glare toward the determined oncoming vehicle or preceding vehicle.

Here, the cases of the basic road shapes are described in the embodiment, but in fact, there are complex road shapes such as an intersection, an uphill or downhill curved road, and a continuously uphill and downhill road. Even in this case, since the complex road shapes are obtained by the combination with the basic road shapes according to the embodiment, the invention may be used by applying the technical spirit of the invention to the complex road shapes. In addition, it is possible to generate the reference optical flow and to detect the road shape with the higher accuracy by actively using the road information obtained from the navigation unit. As a result, it is possible to highly precisely detect the oncoming vehicle or the preceding vehicle.

Furthermore, the embodiment is described in which the oncoming vehicle or the preceding vehicle is detected in order to prevent glare toward the oncoming vehicle or the preceding vehicle. However, the present invention may be just used to detect only the street lamp or delineator existing in the traveling road of the own vehicle or only various light emitting elements existing in the road.

As described above, according to the embodiment of the present invention, the attribute determining unit determines that a bright point optical flow has an attribute of a reference optical flow when an error in the comparison between the reference optical flow and the bright point optical flow is within a predetermined range. Even in the case where an error occurs in a detected road shape or an error occurs in the reference optical flow obtained based on the road shape, it is possible to highly precisely determine the attribute of the bright point optical flow.

Further, in the invention, the road shape detecting unit includes a detector for detecting a shoulder or a lane mark in the captured image and calculating a curvature radius of a curved road based on the detected lane mark or shoulder. Particularly, it is characterized in that the road shape detecting unit calculates the curvature radius of the curved road before an entrance into the curved road. Since it is possible to highly accurately detect the curvature radius of the curved road, it is possible to accurately obtain the reference optical flow based on an attribute of a stationary object such as a street lamp or a delineator disposed in the curved road, and thus to highly precisely determine an attribute of the bright point optical flow.

According to the invention, since the road shape is detected based on the captured image, the reference optical flow is generated based on the detected road shape, and then the bright point optical flow is determined by comparing the reference optical flow with the bright point optical flow measured from the captured image, it is possible to highly precisely determine the attribute of the bright point optical flow. Accordingly, it is possible to highly precisely detect the oncoming vehicle or the preceding vehicle in the captured image, and thus to realize the appropriate light distribution control of the headlamp without giving glare toward the oncoming vehicle or the preceding vehicle.

It is to be understood that the present invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all of the components shown in the embodiment.

What is claimed is:

1. A headlamp controller comprising:
a headlamp unit configured to illuminate a front area of a vehicle with a light distribution pattern that is controllable;
an image capturing camera configured to capture an image of the front area of the vehicle and output a captured image; and
a light distribution controller configured to control the headlamp unit to change the light distribution pattern by performing a calculation based on the captured image output from the image capturing camera, the light distribution controller comprising:
 a road shape detecting unit configured to detect a road shape based on the captured image;
 a reference optical flow generating unit configured to generate a reference optical flow for a target object belonging to one of attributes based on the road shape detected by the road shape detecting unit;
 a bright point optical flow measuring unit configured to measure an optical flow of a bright point defined as a target in the captured image; and
 an attribute determining unit configured to compare the reference optical flow with the optical flow of the bright point and determine which one of the attributes the optical flow of the bright point belongs.

2. The headlamp controller according to claim 1, wherein the attribute determining unit is configured to determine that the optical flow of the bright point belongs to an attribute the same with the reference optical flow when an error in comparison between the reference optical flow and the optical flow of the bright point is within a predetermined range.

3. The headlamp controller according to claim 1, wherein the road shape detecting unit is configured to detect a shoulder or a lane mark of a road in the captured image and to calculate a curvature radius of the road based on the lane mark or the shoulder.

4. The headlamp controller according to claim 3, wherein the road shape detecting unit is configured to calculate the curvature radius of the road before the vehicle enters the road having the curvature radius.

5. The headlamp controller according to claim 1, wherein the attributes comprise a stationary object, a moving object, an oncoming vehicle, and a preceding vehicle.

* * * * *